United States Patent  [15] 3,666,302
Kellett  [45] May 30, 1972

[54] ROTOR ASSEMBLIES
[72] Inventor: Eric Kellett, London, England
[73] Assignee: C.A.V. Limited, Birmingham, England
[22] Filed: Nov. 2, 1970
[21] Appl. No.: 85,876

[30] Foreign Application Priority Data
　　Nov. 28, 1868　Great Britain......................58,221/68

[52] U.S. Cl. ...........................................287/53 R, 416/244
[51] Int. Cl............................................................F16d 1/06
[58] Field of Search............287/53, DIG. 7; 416/244, 244 A

[56] References Cited

UNITED STATES PATENTS 2,038,869　4/1936　Rader ...............................287/DIG. 7
2,297,508　9/1942　Schutte...................................416/244
2,611,632　9/1952　Harris ...................................287/53 R
2,950,082　8/1960　McVeigh................................416/244

FOREIGN PATENTS OR APPLICATIONS 471,417　2/1929　Germany.............................416/244

Primary Examiner—Andrew V. Kundrat
Attorney—Holman & Stern

[57] ABSTRACT

A rotor assembly comprising a metal shaft having a cup shaped portion at one end thereof, a rotor having a spigot portion for engagement with the cup shaped portion, groove means defined about one or both co-operating surfaces of said portions and a filling material occupying said groove means. The filling material is arranged to have a higher co-efficient of thermal expansion than that of the cup shaped portion of the shaft and is compressed into said groove means so as to interpose a compressive stress upon the spigot portion of the rotor.

2 Claims, 1 Drawing Figure

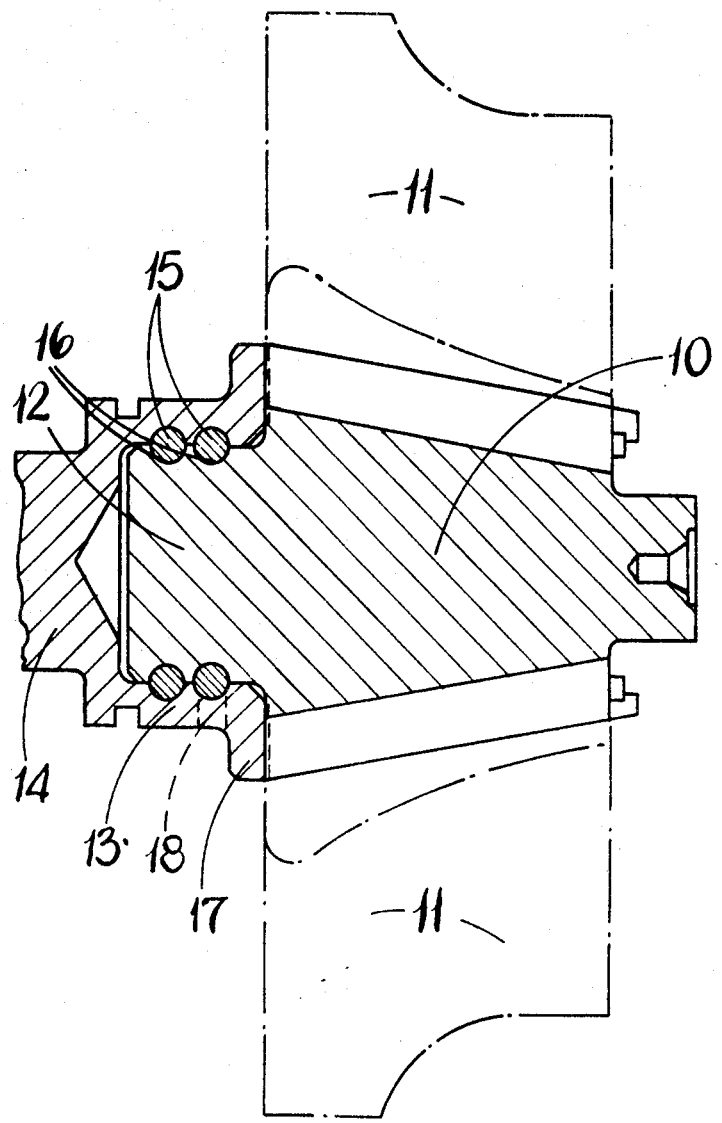

ROTOR ASSEMBLIES

This invention relates to rotor assemblies and has for its object to provide a convenient way of mounting a rotor formed from ceramic material upon a metal shaft.

According to the invention a rotor assembly comprises in combination, a metal shaft having a cup shaped portion formed at one end thereof, a rotor having a spigot portion for engagement within the cup shaped portion of the shaft, groove means defined about the co-operating surfaces of said portions and a filling material occupying said groove means, said filling material having a higher co-efficient of thermal expansion than that of the shaft and being compressed into said groove means so as to impose a compressive stress upon the spigot portion of the rotor.

An example of a rotor assembly in accordance with the invention will now be described with reference to the accompanying drawing which shows the assembly in sectional side elevation.

Referring to the drawing there is provided a rotor which includes a hub portion 10 upon which is mounted a plurality of blades 11. The hub portion 10 is formed from a ceramic material and the blades are formed from a similar material and are mounted within slots formed in the hub portion.

The hub portion 10 is provided with a spigot portion 12 at the wider end thereof and the spigot portion 12 is engaged within a cup shaped portion 13 formed at one end of a shaft 14. The shaft and cup shaped portion 13 are formed from metal.

In order to secure the spigot portion within the cup shaped portion there is formed in the internal peripheral surface of the cup shaped portion, a pair of axially spaced grooves 15 and these are aligned with grooves 16 formed in the spigot portion. When the spigot portion and cup shaped portion are assembled, the pairs of grooves 15, 16 define a pair of groove means which are subsequently filled with a filling material having a higher thermal co-efficient of expansion than that of the shaft. Conveniently the filling material is a metal which is forced into the groove means through tangentially disposed entrances one of which is shown at 18, and the material can be in the form of rods which distort and completely fill the groove means so as to exert a compressive force upon the spigot portion.

In use, the spigot portion since it is formed from a ceramic material does not expand to any substantial extent with increasing temperature however, the cup shaped portion does expand but the fact that the filling material expands at a greater rate than that of the cup shaped portion ensures that there is always a compressive stress applied to the spigot portion so that drive can be transmitted between the rotor and the shaft at all temperatures up to the maximum operating temperature of the rotor.

It will be noted that the cup shaped portion 13 is provided with an outwardly extending flange 17 and against which the blades 11 bear during operation of the rotor assembly.

Having thus described my invention, what I claim as new and desire to secure by Letters Patent is:

1. A rotor assembly comprising in combination, a metal shaft having a cup shaped portion formed at one end thereof, a rotor having a spigot portion for engagement within the cup shaped portion of the shaft, groove means defined about the co-operating surfaces of said portions and a filling material occupying said groove means, said filling material having a higher co-efficient of thermal expansion than that of the shaft and being compressed into said groove means so as to impose a compressive stress upon the spigot portion of the rotor.

2. A rotor assembly as claimed in claim 1 in which said cup shaped portion defines entrance passages to said groove means whereby the filling material may be forced into the groove means.

* * * * *